May 20, 1941. J. V. COOK 2,242,813
CONVEYER FOR BAKING OVENS
Filed April 29, 1940 2 Sheets-Sheet 1
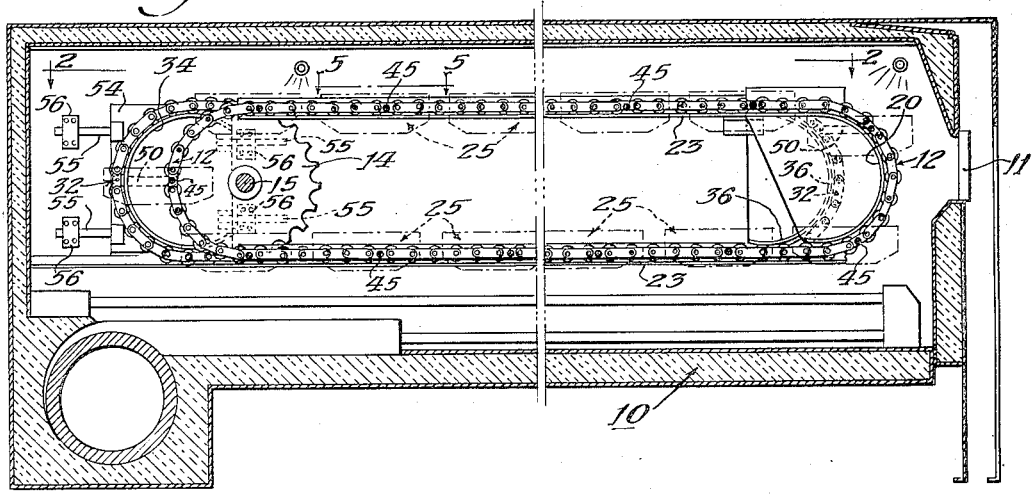
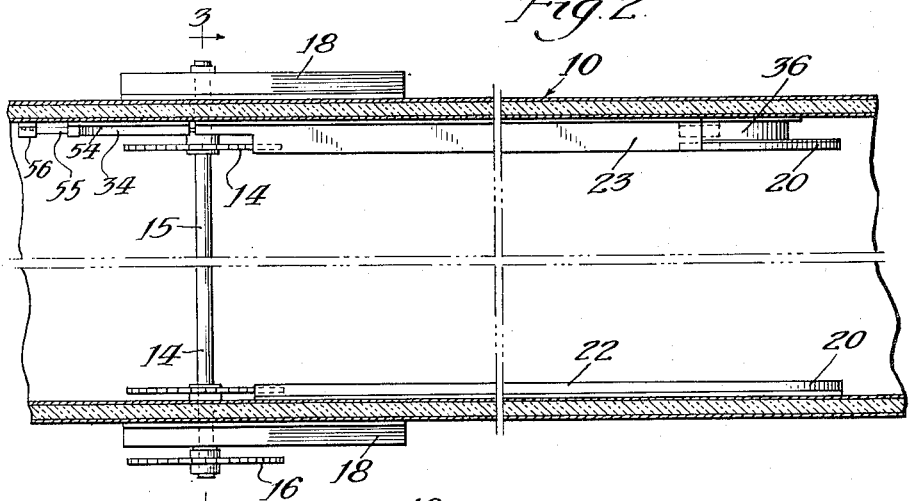
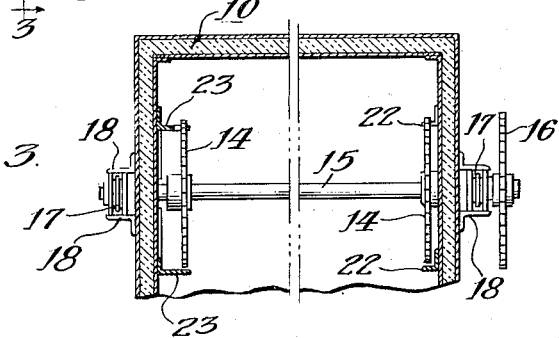
Inventor:
John V. Cook,
By: Bair and Freeman
Attorneys May 20, 1941.  J. V. COOK  2,242,813
CONVEYER FOR BAKING OVENS
Filed April 29, 1940   2 Sheets-Sheet 2
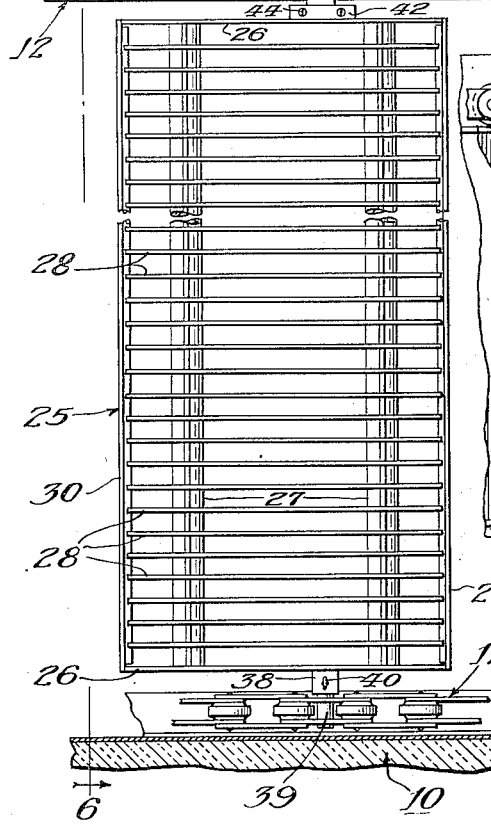
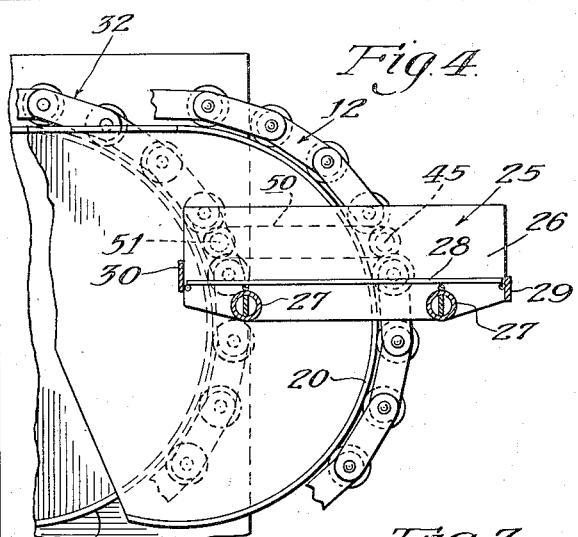
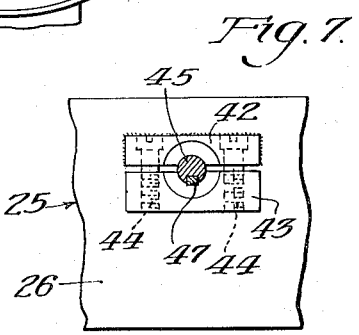
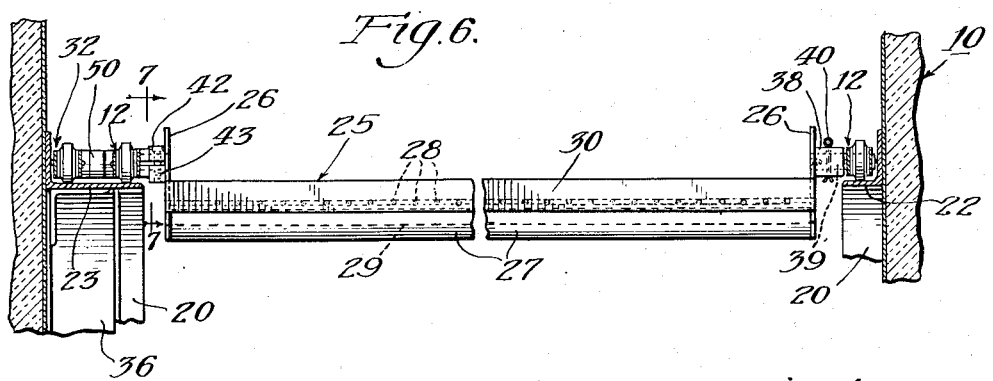
Inventor:
John V. Cook,
By: Bair & Freeman
Attorneys Patented May 20, 1941

2,242,813

UNITED STATES PATENT OFFICE 2,242,813

CONVEYER FOR BAKING OVENS

John V. Cook, Chicago, Ill., assignor to Petersen Oven Company, Chicago, Ill., a corporation of Illinois Application April 29, 1940, Serial No. 332,329

7 Claims. (Cl. 198—138)

This invention relates generally to conveyers, and more particularly to conveyers of the type adapted for the use in baking ovens.

As is well known, the type or character of conveyer employed determines to a large extent the general style of construction and manner of use of the oven. For example, in one type, the conveyer and oven may be such as to permit loading at one end of the conveyer and unloading at the other end, in which case the baking operating takes place during the single course of travel of the foodstuffs through the oven. Another widely used type of construction is such that the foodstuffs are caused to move in a cycle, or circuitous path which permits loading and unloading at the same end of the conveyer.

The present invention is directed to a horizontal conveyer of the type for use in relatively low ovens of the type wherein loading and unloading takes place at the same opening of the oven. Such a conveyer includes a pair of spaced-apart strands of endless chain connected together by a multiplicity of longitudinally spaced-apart trays or material supporting devices, of various forms which are pivotally connected at their opposite ends to the respective strands of chain.

The use of chain type conveyers in baking ovens has long been of great concern to bakers because of the vibration which is inherent in the movement of the conveyer chains and the swinging and jiggling motion of the trays during movement thereof from one horizontal run of the conveyer to the other. This condition is often aggravated by improper positioning of the pans of foodstuffs on the trays which tends to cause the body of foodstuffs to shift toward one end or side of the pan, and which results in nonuniformity of shape, thickness, coloring or "browning" of the baked foodstuff.

The primary object of this invention is to provide an improved form of conveyer of the character indicated which is constructed and arranged so as to eliminate swinging of the trays or material supporting devices, together with a reduction in the amount of vertical motion or jiggling thereof in the course of travel of the conveyer, and wherein the trays or material supporting devices are maintained in a predetermined upright position of adjustment throughout their entire course of travel in the oven.

Another object is to provide an improved conveyer of the type indicated and which is characterized by the provision of means for stabilizing the trays or material supporting devices for maintaining the same in a predetermined upright position of adjustment throughout their entire course of travel.

A further object is to provide an improved type of conveyer of the endless chain type, wherein the trays or material supporting devices are in effect stabilized by a three-point suspension, to preclude swinging movement of the trays or material supporting devices about their pivotal connection to the chains, and maintains said tray in a predetermined upright position throughout their entire course of travel in the baking oven.

Still another object of this invention is to provide an improved mounting for the trays on the conveyer chains, by virtue of which said trays may be adjusted in proper upright position in a manner to compensate for slight angular misalignment of the path of travel of the conveyer chains.

Other objects and advantages of this invention will be apparent from the following description, taken in connection with the accompanying drawings, in which:

Figure 1 is a vertical, longitudinal, sectional view through a baking oven showing diagrammatically the general arrangement of the parts, including the novel conveyer construction embodying the present invention.

Figure 2 is a fragmentary horizontal sectional view through the oven, taken as indicated at the line 2—2 of Figure 1, and in which the conveyer chains and trays are for convenience omitted.

Figure 3 is a vertical, sectional view through the oven at the drive end of the conveyer, taken substantially as indicated at the line 3—3 of Figure 2.

Figure 4 is a fragmentary enlarged sectional view of the end of the conveyer opposite the driving end, showing the mode of guiding the conveyer in its movement from one horizontal run to the other.

Figure 5 is a fragmentary horizontal sectional view through the oven, taken substantially as indicated at the line 5—5 of Figure 1, showing a material transporting tray and conveyer chains together with the means for stabilizing the tray.

Figure 6 is a transverse sectional view through the upper run of the conveyer, taken substantially at line 6—6 on Figure 5.

Figure 7 is a fragmentary detail view of one end of the material transporting tray and its connection to the conveyer chain, taken substantially as indicated at line 7—7 on Figure 6.

In the drawings, I have shown my novel form of conveyer construction mounted in the baking chamber of a baking oven 10 of a conventional form, which is of enclosed low-height type, provided at one end with a door 11, through which the conveyer is loaded and unloaded. Inasmuch as the oven per se constitutes no part of the present invention, it is believed that details of arrangement and construction may be dispensed with.

The conveyer constituting this invention includes a pair of transversely spaced apart strands of endless chain indicated at 12, which are of conventional bar link roller type. These chains, at the far end of the oven chamber are mounted upon a pair of transversely spaced-apart driving sprocket wheels 14, which in turn are mounted on a shaft 15, extending at opposite ends through the side walls of the oven as seen in Figure 3. Mounted on one of the extended ends of said shaft is a sprocket wheel 16, which may be driven by a chain from a suitable source of power (not shown). The opposite end portions of the shaft are journaled in take-up bearings 17, which may be adjusted fore-and-aft for taking up the slack in the chains 12. The take-ups may be understood to be of a conventional type, mounted within angle iron guides indicated at 18, on the outer walls of the oven.

As may be seen in the drawings, the endless chains 12 provide upper and lower horizontal runs and the chains at the front end of the conveyer are trained and guided around curved end tracks 20, which are of semi-circular form secured to the walls of the oven chamber as seen in Figures 2 and 4. The horizontal stretches of the chains are supported on horizontally extending angle iron tracks 22 and 23, secured to the side walls of the oven. The ends of the said tracks 22 and 23 are disposed in proper relation with respect to the sprocket wheels 14 and the curved end track portions 20, so as to provide a smooth, continuous motion to the conveyer chains in their travel from one of the horizontal runs to the other.

Mounted between the respective strands of chain 12 in longitudinally spaced-apart relation thereto, are a multiplicity of material transporting devices, in the nature of trays as indicated at 25. Each of said trays include upstanding walls 26 at opposite ends thereof, pivotally connected to the respective strands of chain. These trays are of reticulated or grille bottom type, each including a pair of parallel spaced-apart tubular members or pipes indicated at 27, extending transversely of the conveyer. Mounted on said pipes, at right angles thereto, are a plurality of parallel, spaced-apart bars or rods 28, which may be welded or otherwise secured to said pipes, as seen in Figure 4, to form a grille bottom. The forward edge of the tray, as determined with respect to the door 11 of the oven chamber, is provided with a reinforcing bar 29, connected to end walls 26 and extending across the ends of said rods 28. The opposite or rear edge of the tray is provided with a stop bar 30, connected to the end walls 26 and disposed a short distance above the level of the supporting rods 28.

The means for maintaining the trays 25 in a predetermined upright position of adjustment during their entire course of travel through the oven includes an auxiliary strand of endless bar-link roller chain indicated at 32, which is disposed adjacent one of the strands 12 of conveyer chain, positioned for movement on the horizontal tracks 23 as seen in the drawings. The horizontal stretches of the auxiliary strand of chain 32 is therefore disposed parallel to and in the same planes as the strands 12 of conveyer chain. At the drive end of the conveyer, the strand of chain 32 is mounted for guided movement around a curved track 34, which as may be seen in Figure 1 is offset rearwardly with respect to the sprocket wheels 14 while at the opposite end of the conveyer, the auxiliary strand of chain 32 is mounted for guided movement around a curved track 36, inwardly offset from the curved end tracks 20 of the conveyer proper. It is to be understood that the radius of the curvature of the tracks 34 and 36 and the curved track portion 20 are equal to the radius of the root diameter of the sprocket wheels 14.

The trays 25 are pivotally mounted on trunnions journaled in the side bars of the respective strands of chain 12. The end of the tray opposite the auxiliary strand of chain 32, is provided with a fixed boss 38 in which a trunnion 39 is rigidly secured by means of a cotter pin 40 while the projecting portion of the trunnion is journalled in openings formed in a pair of aligned side bars of a link of the conveyer chain 12.

At the opposite end of the tray the trunnion support is composed of two pieces, an upper part 42, fixedly welded to the end wall 26 of the tray as seen in Figure 7, and a cooperating, movable block member 43, connected to the block 42 by a pair of screws 44, spaced on opposite sides of the trunnion indicated at 45. The trunnion and lower block portion 43 are securely connected against rotative motion relative to each other by a key 47. Said trunnion 45 extends into openings formed in a pair of aligned side bars of a link of the adjacent strand of the chain 12, and to the outer end portion of the trunnion, beyond the chain 12, is rigidly attached, a rigid arm 50 disposed in a horizontal plane above the material supporting surface of the tray proper, as may be seen in Figure 4. The forward or free end of the arm is provided with a trunnion 51 extending at right angles to the arm and journaled in openings formed in a pair of aligned side bars of a link of the auxiliary strand of chain 32.

By virtue of the construction described, the trunnion 51 together with the trunnions 39 and 45 in effect provide a three-point suspension for each of the trays 25, and stabilize the trays against vertical motion, and eliminates swinging or jiggling motion of the trays about the axes of the trunnions 39 and 45, and thereby maintains the trays in predetermined upright position throughout their entire course of travel around the conveyer. It is apparent that as the auxiliary chain 32, travels around the curved track portion 34, at the drive end of the conveyer, the arms 50 move vertically, while disposed in substantially horizontal planes, during the travel of the trays from one of the horizontal runs to the other, due to the fact that the outer or free end of the arm is guided and restrained by the auxiliary strand of chain and is caused to move in a predetermined path about the curved track portion 34. Likewise at the opposite end of the conveyer, the auxiliary strand of chain moves in a predetermined path about the curved track 36 and similarly maintains the rigid arms 50 in substantially horizontal planes in movement of the trays from one horizontal run of the conveyer to the other.

To compensate for slight vertical misalignment of the conveyer chains 12, in the initial installation, which results in the horizontal strands of chain moving in planes not truly horizontal, the trays are adjustable with respect to the horizontal path of travel of the chains, so that the load supporting surfaces of each tray is at all times maintained in a substantially true, horizontal plane. This compensation is provided for in the supporting blocks for the trunnion 45. It will be apparent from Figure 7 of the drawings that when one of the screws 44 are tightened and the other loosened, the block section 42 together with the tray 25 is rocked slightly about the axis of the trunnion 45, so as to obtain relatively accurate adjustment of the load supporting surface of the trays, by virtue of which the foodstuffs being baked do not become distorted in shape or of non-uniform thickness, such as in the case of cakes or pies and the like.

In a conveyer of the type disclosed, the foodstuffs are placed upon the trays by access through the oven door 11, and are caused to travel through the complete cycle of the movement of the conveyor, and are then removed at the same opening to the oven, and it is to be understood that the conveyer may be driven for travel in either direction.

As above mentioned, it is often desirable at times to vary the slack in the conveyer chains 12, in order to maintain a proper degree of tension therein, and which is accomplished by suitable take-up devices enclosed within the guides 18. In order to compensate for such adjustment which results in shifting of the driving sprocket wheels 14 fore-and-aft, the curved track portion 34 for the auxiliary strand of chain 32 is connected to a supporting plate 54, which is provided with a pair of vertically spaced guide bars 55, at opposite ends, slidably guided in brackets 56 secured to the wall of the oven, as seen in Figure 1. The mounting plate 54 is rigidly secured to the adjacent take-up bearing so as to be simultaneously movable therewith upon adjustment of the take-up devices, and thereby varies the tension in the auxiliary strand of chain 32 as in the chains 12 so as to insure maintaining of the curved track portion 34 in proper relation to the sprocket wheels 14.

Although I have herein shown and described certain preferred embodiments of my invention, manifestly it is capable of further modification and rearrangement of parts without departing from the spirit and scope thereof. I do not, therefore, wish to be understood as limiting this invention to the precise embodiments herein disclosed, except as I may be so limited in the appended claims.

I claim as my invention:

1. In a conveyer, the combination of a pair of aligned, axially spaced-apart driving sprocket wheels, separate, spaced-apart strands of endless chain mounted on said wheels, track means for the horizontal stretches of the upper and lower runs of each chain for supporting them substantially level, a plurality of separate, spaced-apart material supporting devices, trunnions providing pivotal connection for the opposite ends of each device to the respective strands of chain, one of said trunnions at one end of each device being mounted in fixed relation thereto, said trunnion connections being adjacent the upper end of each of the material supporting devices, offset to one side of the center line thereof with respect to its direction of travel, an auxiliary strand of endless chain disposed parallel and adjacent to the strand of chain associated with said fixed trunnions of the material supporting device, means for guiding said auxiliary strand of chain for movement in a predetermined path, and separate rigid arms for each device, said arms each being fixedly connected at one end to the fixed trunnion and extending in a direction toward and beyond said center line of the material supporting device, the opposite end of said arms being pivotally connected to said auxiliary strand of chain.

2. In a conveyer, the combination of a pair of aligned, axially spaced-apart driving sprocket wheels, separate, spaced-apart strands of endless chain mounted on said wheels, track means for the horizontal stretches of the upper and lower runs of each chain for supporting them substantially level, a plurality of separate, spaced-apart material supporting devices, trunnions providing pivotal connection for the opposite ends of each device to the respective strands of chain, one of said trunnions at one end of each device being mounted in fixed relation thereto, said trunnion connections being offset to one side of the center line thereof with respect to its direction of travel, an auxiliary strand of endless chain disposed parallel and adjacent to the strand of chain associated with said fixed trunnions of the material supporting device, means for guiding said auxiliary strand of chain for movement in a predetermined path, and separate rigid arms for each device, said arms each being fixedly connected at one end to the fixed trunnion and extending in a direction toward and beyond said center line of the material supporting device, the opposite end of said arms being pivotally connected to said auxiliary strand of chain.

3. In a conveyer, the combination of a pair of aligned, axially spaced-apart driving sprocket wheels, separate, spaced-apart strands of endless chain mounted on said wheels, track means for the horizontal stretches of the upper and lower runs of each chain for supporting them substantially level, a plurality of separate, spaced-apart material supporting devices, trunnions providing pivotal connection for the opposite ends of each device to the respective strands of chain, one of said trunnions at one end of each device being mounted in fixed relation thereto, means including a rigid connection to the fixed trunnion of each device for precluding pivotal movement of said devices about the axes of their pivotal connections and maintain said devices in a predetermined upright position of adjustment throughout their course of travel, and means associated with each fixed trunnion and the adjacent end of said material supporting devices for varying the upright position of adjustment of said devices.

4. In a conveyer, the combination of a pair of aligned, axially spaced-apart driving sprocket wheels, separate, spaced-apart strands of endless chain mounted on said wheels, track means for the horizontal stretches of the upper and lower runs of each chain for supporting them substantially level, a plurality of separate, spaced-apart material supporting devices, trunnions providing pivotal connection for the opposite ends of each device to the respective strands of chain, one of said trunnions at one end of each device being mounted in fixed relation thereto, means including a rigid connection to the fixed trunnion of each device for precluding pivotal movement of said devices about the axes of their pivotal connections and maintain said devices in a predetermined upright position of adjustment throughout their course of travel, and means associated with each fixed trunnion and the adjacent end of said material supporting devices for varying the upright position of adjustment of said devices, said last mentioned means each comprising a bearing segment for the trunnion fixedly secured to said device, a cooperating bearing segment keyed to said fixed trunnion, and a pair of fastening elements, on opposite sides of the trunnion for connecting the last mentioned bearing segment to the fixed bearing segment.

5. In a conveyer, the combination of a pair of aligned, axially spaced-apart driving sprocket wheels at one end, a pair of spaced-apart curved tracks at the other end aligned with said wheels, separate, spaced-apart strands of endless chain, each being trained around one sprocket wheel and an aligned curved end track, a plurality of spaced-apart material supporting devices, trunnions providing pivotal connection of the opposite ends of said devices to the respective strands of chain, trunnions at one corresponding end of said devices being fixed relative to said device, an auxiliary strand of endless chain disposed adjacent to the strand of chain associated with the fixed trunnions, curved tracks for guiding opposite ends of said auxiliary strand of chain, horizontal tracks for supporting the upper and lower runs of the horizontal stretches of said chains, and separate rigid arms for each device, each being fixedly connected at one end to the fixed trunnion and the other end being pivotally connected to the auxiliary strand of chain, whereby said material supporting devices are held against movement about their pivot axes and maintained in predetermined upright position throughout their entire course of travel.

6. In a conveyer, the combination of a pair of aligned, axially spaced-apart driving sprocket wheels at one end, a pair of spaced-apart curved tracks at the other end aligned with said wheels, separate, spaced-apart strands of endless chain, each being trained around one sprocket wheel and an aligned curved end track, a plurality of spaced-apart material supporting devices, trunnions providing pivotal connection of the opposite ends of said devices to the respective strands of chain, trunnions at one corresponding end of said devices being fixed relative to said device, an auxiliary strand of endless chain disposed adjacent to the strand of chain associated with the fixed trunnions, curved tracks for guiding opposite ends of said auxiliary strand of chain, horizontal tracks for supporting the upper and lower runs of the horizontal stretches of said chains, and separate rigid arms for each device, each being fixedly connected at one end to the fixed trunnion and the other end being pivotally connected to the auxiliary strand of chain, the horizontal stretches of said chains being disposed in the same planes, and the curved tracks for the auxiliary chain being correspondingly offset longitudinally relatively to said sprocket wheels and the curved tracks for the first mentioned pair of chains by a distance substantially equal to the length of said arms, whereby said material supporting devices are held against movement about their pivot axes and maintained in predetermined upright position throughout their entire course of travel.

7. In a conveyer, the combination of a pair of aligned, axially spaced-apart driving sprocket wheels at one end, a pair of spaced-apart curved tracks at the other end aligned with said wheels, separate, spaced-apart strands of endless chain, each being trained around one sprocket wheel and an aligned curved end track, said sprocket wheels being mounted for adjustment fore-and-aft for varying the slack in the chains, a plurality of spaced-apart material supporting devices, trunnions providing pivotal connection of the opposite ends of said devices to the respective strands of chain, trunnions at one corresponding end of said devices being fixed relative to said device, an auxiliary strand of endless chain disposed adjacent to the strand of chain associated with the fixed trunnions, curved tracks for guiding opposite ends of said auxiliary strand of chain, horizontal tracks for supporting the upper and lower runs of the horizontal stretches of said chains, the curved end track for the auxiliary chain, adjacent one of the sprocket wheels, being slidably mounted for fore-and-aft movement with said sprocket wheels, and separate rigid arms for each device, each being fixedly connected at one end to the fixed trunnion and the other end being pivotally connected to the auxiliary strand of chain, the horizontal stretches of said chains being disposed in the same planes, and the curved tracks for the auxiliary chain being correspondingly offset longitudinally relatively to said sprocket wheels and the curved tracks for the first mentioned pair of chains by a distance substantially equal to the length of said arms, whereby said material supporting devices are held against movement about their pivot axes and maintained in predetermined upright position throughout their entire course of travel.

JOHN V. COOK.